Figure 1:
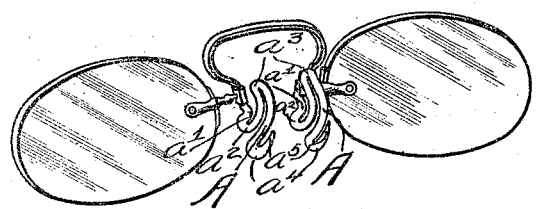

J. H. OSTRANDER.
NOSE GUARD FOR EYEGLASSES.
APPLICATION FILED MAR. 11, 1908.

1,028,773.

Patented June 4, 1912.

Witnesses
J. W. Angell
N. E. Hannah

Inventor
James H. Ostrander
by Charles Swifius
Atty.

UNITED STATES PATENT OFFICE.

JAMES H. OSTRANDER, OF CHICAGO, ILLINOIS.

NOSE-GUARD FOR EYEGLASSES.

1,028,773.  Specification of Letters Patent.  Patented June 4, 1912.

Application filed March 11, 1908. Serial No. 420,364.

*To all whom it may concern:*

Be it known that I, JAMES H. OSTRANDER, a citizen of the United States, and a resident of Chicago, Cook county, Illinois, have invented certain new and useful Improvements in Nose-Guards for Eyeglasses; and I do hereby declare that the following is a full, clear, and exact description of the same, reference being had to the accompanying drawings, and to the letters of reference marked thereon, which form a part of this specification.

This invention relates to that class of nose guards for eye glasses set forth in my patents for "nose guard or clip for eye glasses", Number 906,154, issued December 8, 1908; "nose guards for eye glasses", Number 913,154, issued Feb. 23, 1909; "nose clips or guards for eye glasses", Number 913,647, issued Feb. 23, 1909; "nose guards for eye glasses", Number 932,491, issued Aug. 31, 1909, in which advantage is taken of the resiliency of comparatively thin metallic plates and bars as the case may be, variously disposed relatively to the post if such be used, that the tension and frictional engagement thereof upon the nose may best hold the eye glasses in place. In such glasses ordinarily the longitudinal horizontal axis passing through the center of gravity lies more or less beyond or outwardly from the point of support and consequently there is a constant tendency for the glasses to tip forward and outward, thus displacing the same.

To obviate these difficulties and to afford such a positive support for the glasses as to hold the same as securely in place as though bows are used, is the object of this and of my said former inventions. To accomplish the said result such resiliency of the guard is necessary as to permit of its adapting itself readily to the conformation of the nose and to insure a broad bearing with practically uniform pressure at all parts of the guard, said pressure of necessity being sufficient to sustain the weight of the eye glasses through the surface friction and tension and the gripping effect of the guard on the nose. It is also, of course, important to carry the supporting grip of the guard upwardly and outwardly, if possible, to near the longitudinal horizontal axis passing through the center of gravity, especially for the use of those having a deep nose, to provide an outward bend extending below and beyond the said axis and tending to brace the glasses on the nose and also to afford a bracing or staying effect, both above and rearwardly and below and rearwardly.

The invention embraces the novel features hereinafter described and pointed out and defined in the appended claims.

Figure 2:
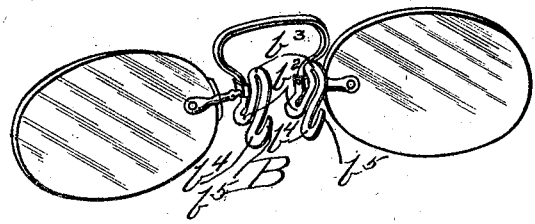
Figures 3, 4, 5, 6:
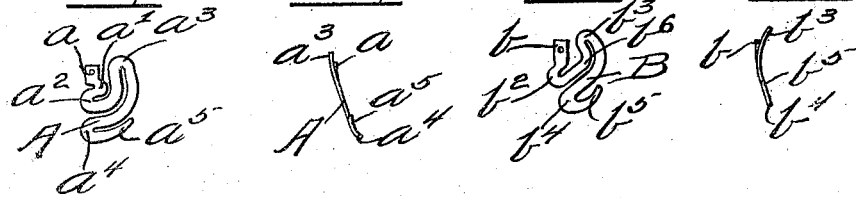

In the drawings: Figure 1 is a view somewhat in perspective of a pair of eye glasses equipped with guards embodying my invention. Fig. 2 is a similar view illustrating a slightly modified guard. Fig. 3 is a slightly enlarged face view of a guard illustrated in Fig. 1. Fig. 4 is an edge view thereof illustrating one convenient way of bending and shaping. Fig. 5 is a face view of a guard illustrated in Fig. 2. Fig. 6 is an edge view illustrating shaping the guard to conform to the nose.

As shown in the drawings: the guard A, shown in Figs. 1, 3 and 4, comprises a thin plate of resilient metal conveniently gold, which may be stamped or cut in any convenient suitable manner to increase resiliency and gripping effect and affording an apertured attaching end $a$, adapted to be engaged between the flanges of the post, if a post be used. Said guard when stamped comprises a narrow, resilient strip of metal which extends downwardly from the apertured attaching end $a$, and rearwardly providing a bend $a'$, and then forwardly beyond the attaching end, forming a bend $a^2$, and thence again rearwardly and upwardly to a point higher than the attaching end and forming a bend or loop $a^3$, thence downwardly and forwardly below the attaching end and bends or loops $a'$—$a^2$, forming a lower bend $a^4$. From this point the strip tapers rearwardly and inclines slightly upwardly, as shown, to the extremity $a^5$.

The guard is attached to the eye glasses conveniently as illustrated in Fig. 1, with the free end thereof directed upwardly and rearwardly. The bends $a'$—$a^2$ greatly increase the resiliency and assist in conforming or adjusting the guard to fit the nose inasmuch as the guard at any of said bends or loops may be slightly bent or formed as illustrated in Fig. 4 or 6 to not only obtain a flat frictional pressure on the skin but as well to set one or more of the edges or bends slightly obliquely with the surface to which attached to afford a more positive grip.

In the construction illustrated in Figs. 2, 5, and 6, the attaching ends $b$ are directed as before described, but a bend corresponding with the bend $a'$, is omitted and the guard extends downwardly and forwardly from the attaching end to afford an obliquely forwardly and downwardly directed loop $b^2$. Thence the guard is directed upwardly and rearwardly to afford a bend $b^6$, forwardly and upwardly to a point higher than the attaching end of the guard affording a bend or loop $b^3$. Thence the guard extends rearwardly and downwardly and then forwardly in a broad sweep to the lower bend $b^4$, from whence the tail of the guard $b^5$, extends rearwardly and upwardly. This construction is substantially identical with the construction illustrated in Figs. 1, 3 and 4, with the exception that the portion above the bend $b^6$, may be bent or sprung to afford either a forward or a rear edge grip. The top thereof may be folded over slightly, or the guard as a whole may be curved to form an arc having any radius as illustrated in Fig. 6, or sprung into a great variety of positions, depending upon the surface to which the guard is to be adjusted. In both said constructions an almost infinite variety of effects may be secured by slight variations in the surface contours of the guard and by inclining the edges or bending or slightly twisting the loops or bends. In this way the optician may shape the guard to afford the maximum gripping effect at approximately the bend $a^3$ with yielding pressure at $a^2$, and yielding but positive pressure at the tail $a^5$.

Any desired variation in the application of pressure by shaping the guard can be secured and in consequence the guard can be adapted to any shape of nose and holding effect of the guard can always be depended on. Of course, the bend $a^2$ engaging forwardly at the attaching ends serves at all times to positively support the center of gravity, while the rearwardly directed upper bends and the tail of the guard serve as rearwardly and upwardly and as downwardly directed braces or retaining members to hold the glasses from slipping and falling. The narrow and looped form of the strip forming the guard serves to afford maximum resiliency and the highest frictional holding effect, such holding effect being capable of any desired variation because of the conformation to the surface and perfect adaptation or fit.

Obviously details of construction may be varied. I therefore do not purpose limiting this application for patent otherwise than necessitated by the prior art.

I claim as my invention:

1. A nose guard comprising a strip stamped from a sheet of metal and having an upwardly directed end for attachment and below the attaching end curving edgewise to the inner edge of and beyond the attaching end, then bending edgewise beneath the other bend or fold to the outer side of and beyond the attaching end, said strip then bending or folding edgewise inwardly and upwardly to a point above the attaching end thence curved inwardly edgewise and downward lengthwise of the upward fold, and substantially parallel with and in close proximity thereto and outwardly beyond the attaching end to correspond with the second bend or fold, the extremity of the strip then curved edgewise inwardly and upwardly parallel to the last named downwardly curved part and the guard sprung or bent to throw the edges of some of the parts thereof out of a common plane.

2. A device of the class described embracing a thin flat resilient strip of metal having an upwardly directed attaching end, a portion of said strip curving edgewise to the outer edge of and beyond the attaching end, said strip then bending or folding edgewise inwardly and upwardly to a point above the attaching end thence curved inwardly edgewise and downward lengthwise of the upward fold, and substantially parallel with and in close proximity thereto and outwardly beyond the attaching end to correspond with the second bend or fold, the extremity of the strip then curved edgewise and upwardly parallel to the last named downwardly curved part and the guard sprung or bent to throw the edges of some of the parts thereof out of a common plane.

3. A nose guard embracing a continuous contacting strip affording a plurality of folds, some of said folds normally projecting forwardly beneath and beyond a point of attachment of said strip, other of said folds projecting normally rearwardly of said point of attachment and together therewith affording a support on either side of the point of attachment.

In testimony whereof I have hereunto subscribed my name in the presence of two subscribing witnesses.

JAMES H. OSTRANDER.

Witnesses:
K. E. HANNAH,
C. W. HILLS.